Figure 1:
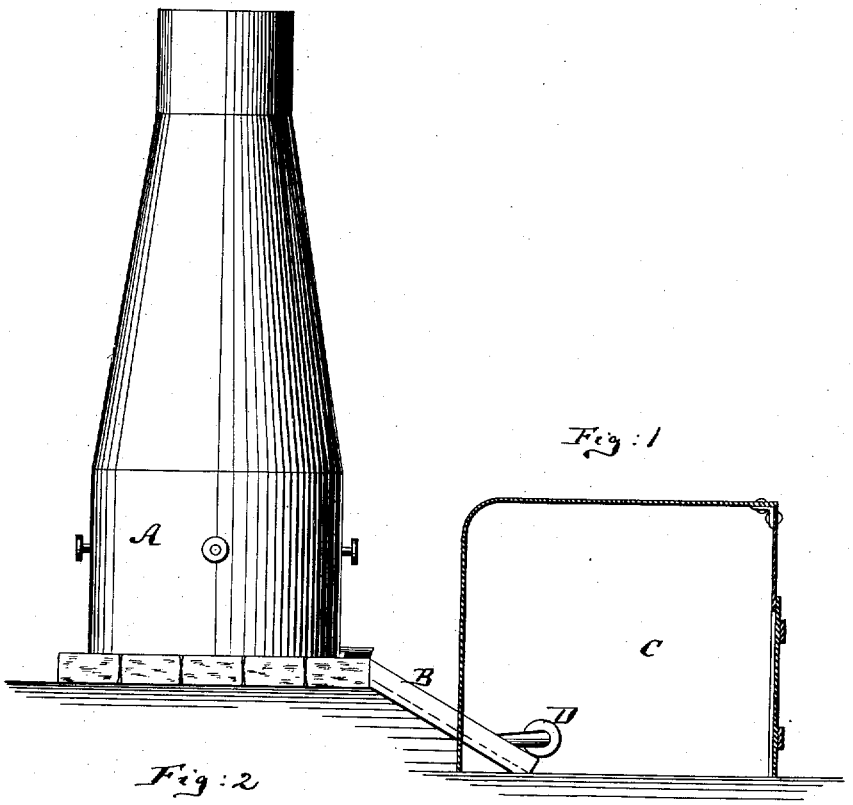

J. PLAYER, Dec'd.

AUGUSTA AMELIA GLEITSMANN, Adm'x.

PROCESS FOR TREATING FURNACE-SLAG,

No. 6,894. Reissued Feb. 1, 1876.

Witnesses:

A. Monaga.

F. V. Briesen

Augusta Amelia Gleitsmann by her attorney

A. v. Briesen

UNITED STATES PATENT OFFICE.

AUGUSTA AMELIA GLEITSMANN, OF ASHEVILLE, N. C., ADMINISTRATRIX OF JOHN PLAYER, DECEASED, FOR HERSELF AND AS ASSIGNEE OF HENRY McALLISTER, JR., ADMINISTRATOR OF SAID JOHN PLAYER.

IMPROVEMENT IN PROCESSES FOR TREATING FURNACE-SLAG.

Specification forming part of Letters Patent No. 103,650, dated May 31, 1870; reissue No. 6,894, dated February 1, 1876; application filed December 28, 1875.

DIVISION A.

*To all whom it may concern:*

Be it known that JOHN PLAYER, deceased, sometime of Norton, near Stockton-on-Tees, in the county of Durham, in England, and a subject of the Kingdom of Great Britain, late of the city and county of Philadelphia, in the State of Pennsylvania, was in his lifetime the inventor or discoverer of a certain new and useful Method of Producing Mineral Wool from Slag, Scoria, or equivalent substances, of which the following is a specification:

The abundance and cheapness of the ready-made vitrified material afforded by the vast waste of slag or scoria at blast-furnaces and glass-works will doubtless render it unnecessary to prepare scoriaceous substances expressly for this process; but should it be deemed or found more economical, or otherwise desirable, a mixture of silicious, calcareous, and other ingredients may readily be made and vitrified after various well-known formulæ.

From the slag or scoria subjected to the process hereinafter described is obtained a vitrified fibrous material, highly non-conducting, incombustible, and especially adapted to many uses, of which it may suffice to enumerate the covering or jacketing of steam-pipes, steam-boilers, hot-blast pipes, and the like, the lining of refrigerators, the filling of fire-proof safes, and other similar applications for preventing the transmission of heat or arresting the spread of fire.

This material may be used in bulk or formed into sheets or pads, in the same manner as hair, felt, or cotton-wadding is formed; or it may be spun into rope or yarn, and applied in various ways that are obvious.

The invention consists in melting slag, scoria, or scoriaceous substances in a cupola or furnace of suitable construction, adapted to the purpose, and from which a suitable conduit is provided, so that the melted mass may be allowed to flow from the cupola or furnace in a small stream. Upon this flowing mass a stream or blast of air (by preference a hot-blast) is directed by any suitable device, and this blast of air, acting upon the flowing slag or other mineral, separates or subdivides it into exceedingly fine filaments or fibers, which are blown off into and retained in a suitable chamber or room provided over the blast. From this receptacle it may be removed, to be packed or for use Instead of a blast of air, or hot air alone, a jet of air and steam, or of steam alone, either ordinary or superheated, may be directed upon the flowing slag or other mineral without affecting the result, otherwise than, perhaps, in degree.

The annexed drawing will show the form of apparatus which the said JOHN PLAYER had devised for the conduct of this process.

Figure 2:
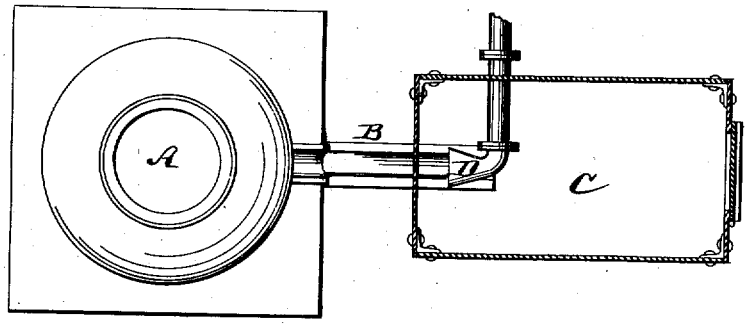

Figure 1 is an elevation of a furnace, with the chamber for receiving the mineral wool, in section; Fig. 2, a plan, with the chamber in section.

Similar letters of reference indicate corresponding parts in both figures.

The blast of air or jet of steam, or of air and steam, may be obtained or derived from a fan, or from a boiler and fan, or in any other way.

The slag or scoria, or scoriaceous substance, is melted or produced in a suitable furnace, A, and flows down an inclined hearth, B, into a chamber, C, where it is exposed to a blast or jet from a pipe, or nozzle, or tuyere, D.

The fibrous material produced by the blast, being very light, is blown against the walls of the chamber, and deflected into the chamber behind the blast-pipe, where it accumulates until removed.

It is obvious that the blast or jet might be applied to the slag as it runs from an ordinary blast-furnace, and thus save the reheating of the slag; and this would, perhaps, constitute the simplest application of the invention.

The apparatus above described, however, forms no part of the subject-matter herein claimed, as the same may be varied at the dictates of convenience or economy; but

What is claimed herein as the invention of the said JOHN PLAYER is—

The method hereinbefore set forth, of producing mineral wool or vitreous fiber by subjecting a stream of meated slag, scoria, or scoriaceous substance to a blast or jet, substantially in the manner herein described.

AUGUSTA A. GLEITSMANN.

Witnesses:
V. K. SPEAR,
GEO. A. HOOVER.